United States Patent [19]

Martin

[11] 4,056,732

[45] Nov. 1, 1977

[54] VOLTAGE REGULATION IN AN ELECTRONIC ENGINE CONTROL SYSTEM HAVING DIGITAL EFFECTOR ACTUATORS

[75] Inventor: Anthony Newman Martin, Simsbury, Conn.

[73] Assignee: United Technologies Corporation, Hartford, Conn.

[21] Appl. No.: 717,433

[22] Filed: Aug. 24, 1976

[51] Int. Cl.$^2$ .............. H02J 3/14

[52] U.S. Cl. .............. 307/33; 323/19; 318/580; 318/650

[58] Field of Search .............. 318/580, 650; 307/24, 307/31, 32, 33, 35, 38, 39, 85-87, 62, 4, 34; 290/2, 40; 322/7, 8, 100; 323/19

[56] References Cited

U.S. PATENT DOCUMENTS

| | | | |
|---|---|---|---|
| 3,291,998 | 12/1966 | Wildi | 307/62 |
| 3,530,300 | 9/1970 | Gunther et al. | 307/33 |
| 3,870,931 | 3/1975 | Myers | 361/194 |
| 3,935,471 | 1/1976 | Bishop et al. | 307/32 |

*Primary Examiner*—Robert K. Schaefer
*Assistant Examiner*—Michael Mutter
*Attorney, Agent, or Firm*—Dominic J. Chiantera

[57] ABSTRACT

The unregulated AC electrical power provided by an engine driven alternator to an airborne electronic engine control system which controls the performance of a gas turbine engine, is rectified to provide unregulated DC voltage signals for system electrical power. The system provides position control of a plurality of controlled surfaces within the engine through a plurality of digital effector servo actuators, each of which includes a mechanical assembly for providing displacement of the surface in each of two directions in response to a magnetic field provided by a respective one of two oppositely polarized solenoids disposed within the actuator. The unregulated DC voltage signal is presented to one or the other of the solenoids, in dependence on a desired displacement direction, through a corresponding one of a pair of gated switches in response to the ON portion of a position gate signal presented to a gate input thereof, the energized solenoid providing a magnetic field with a polarity in dependence on the selected displacement direction. Voltage regulation circuitry provides voltage regulation gate signals having an ON portion with a time duration proportional to the excess amplitude of the unregulated DC voltage signal amplitude above that of a reference voltage level, and presents the regulation gate signals, simultaneously, to both solenoid gated switches in each of the plurality of actuators in the absence of a position gate signal to the respective actuator to provide cancelling magnetic fields which inhibits actuator displacement while increasing the current load to cause attenuation of the unregulated voltage signal amplitude.

7 Claims, 5 Drawing Figures

VOLTAGE REGULATION IN AN ELECTRONIC ENGINE CONTROL SYSTEM HAVING DIGITAL EFFECTOR ACTUATORS

BACKGROUND OF THE INVENTION

1. Field of Invention

This invention relates to voltage regulation, and more particularly to voltage regulation in an electronic engine control system having digital effector type servo actuators.

2. Description of the Prior Art

Modern jet engines, such as gas turbine engines, employ electronic engine control (EEC) units to control the engine operating performance. The EEC units receive signal information on sensed engine operating parameters, such as rotor speed, air intake temperature, and exhaust temperature and pressure levels, and process the information through known signal processing algorithms to provide position signals to each of a plurality of digital effector servo actuators of the type shown and described in a commonly owned, copending application entitled ADAPTIVE CONTROL SYSTEM USING POSITION FEEDBACK, U.S. Ser. No. 586,010 filed on June 1, 1975 by A. N. Martin now U.S. Pat. No. 4,007,361, Feb. 8, 1977, which direct engine performance through position control of a corresponding plurality of controlled surfaces within the engine, such as fuel valves, stator vane positions, and engine exhaust nozzle positions. The EEC units receive AC electrical power from dedicated, engine driven alternators which are directly driven from the engine gearbox, without the speed control provided for the engine driven alternators providing 115 volts rms, 400 hertz general aircraft power. This is due to the lower reliability of such speed controls which prohibit their use in a primary control system, such as that of the EEC unit, where failure of the constant speed device may result in catastrophic engine failure. As a result, the EEC alternators rotate at an angle of velocity equal to the engine RPM levels. Since an alternator having a fixed number of poles provides output voltage signals whose amplitude and frequency are directly proportional to the angular velocity of the rotor, the engine driven EEC alternators provide an output voltage whose amplitude and frequency increases with increasing engine RPM levels.

The general speed range of an aircraft engine varies from ground speeds of 10 to 15 percent of max RPM, to typical cruise speeds in the range of 90 to 100 percent of max RPM, causing an appreciable increase in alternator output electrical power over this range. The EEC units require essentially constant input power (which is independent of engine speed) for proper operation, and since the EEC must provide engine control over the entire engine RPM range, the alternator must be sized to provide the required EEC power at the minimum engine RPM levels. An alternator which is sized to provide the required EEC unit power at 10 percent of max RPM, may provide as much as five times the required EEC power at the cruise speed range of 90 to 100 percent of max RPM, such that at cruise RPM levels there is a significant amount of excess power which is generated by the alternator and which must be dissipated within the EEC unit. In addition to the excess power which must be dissipated, the alternator output voltage amplitude levels must be limited to a determined level to protect the EEC unit components against voltage breakdown, or overstress.

In typical prior art EEC systems, the alternator AC output voltage is rectified to provide an unregulated DC voltage signal, and the unregulated DC signal is presented to a dedicated voltage regulation circuit. The regulation circuit, typically of the series pass type, provides amplitude control of the output signal through feedback control of the current through a series pass transistor. Since the output amplitude is controlled, and the unregulated DC signal increases with engine RPM in dependence on the AC input voltage, the voltage developed across the regulator increases substantially with engine RPM increase resulting in excessive power dissipation within the EEC unit. To eliminate the resulting heat buildup within the unit, complex cooling systems and large surface area heat sinks are required, which in some systems account for as much as 40 percent of the control unit size and weight. This is of particular concern in aircraft engine control systems where both weight and size must be minimized, and in small, portable engine units where the same considerations govern. Furthermore, in view of the necessity of providing improved engines capable of ever higher horsepower to weight ratios to improve fuel economy, the size and weight of the engine control systems must be similarly reduced is such systems are to be practical.

SUMMARY OF THE INVENTION

An object of the present invention is to provide a method and apparatus for regulating the voltage amplitude of the unregulated input electrical power to an electronic engine control system having one or more digital effector actuators. Another object of the present invention is to provide voltage regulation apparatus having small size and weight, making it suitable for use in engine control systems for airborne and portable engines.

According to the present invention, an electronic engine control system receives unregulated, AC electrical power from an engine driven, variable speed alternator which is rectified to provide an unregulated DC voltage signal. The system, which controls engine performance by position control of a plurality of controlled surfaces within the engine through a corresponding one of a plurality of digital effector servo actuators of the type which include a mechanical assembly for providing displacement of the corresponding controlled surface in each of two directions in response to a magnetic field provided by a respective one of two oppositely polarized solenoids disposed within the actuator, presents the unregulated DC voltage signal to each solenoid through a corresponding one of a pair of gated switches, each operable in response to an ON portion of a position change gate signal presented to a gate input thereof. The position change gate signals are provided to the gated switches in each of the plurality of servo actuators from a control unit in response to displacement signals received by the control unit for each of the controlled surfaces. The engine control system is provided with voltage regulation circuitry which compares the amplitude of the unregulated DC voltage signal to a reference voltage signal of determined amplitude, and provides a voltage error signal in response to an unregulated voltage signal amplitude in excess of that of the reference signal. The regulation circuitry provides voltage regulation gate signals having an ON portion with a time duration proportional to the magnitude of the voltage error signal, and presents the regulation signals to both solenoids of each actuator in the absence of a position change gate signal to the actuator, providing simultaneous energizing of both solenoids for a time duration equal to that of the regulation gate signal ON portion, providing cancelling magnetic fields which inhibit actuator displacement, and providing increased load current demand to cause attenuation of the unregulated voltage signal amplitude.

The voltage regulation method and apparatus of the present invention provides the regulation gate signals only in response to the presence of a voltage error signal, and presents the regulation gate signals to the actuators only in the absence of a position gate signal from the control unit, such that system performance is not effected. The voltage regulation is provided without effect to the system performance by given priority to the position change gate signals, such that the appearance of a position change signal from the control unit to the respective actuator causes removal of the regulation gate signals for the duration of the position gate signal ON portion. The solenoids are the largest single power consumption components within the system, such that the simultaneous energizing of both solenoid coils provides an effective method of selectively increasing the current load demands on the alternator and thereby regulating the alternator output voltage. The solenoids are inherently capable of providing high power dissipation levels, and in addition are provided with excellent heat sink structures provided by the actuator housing itself, such that the need for dedicated heat sink structures is reduced, with a corresponding reduction in size and weight of the control unit. The contolled energizing of the actuator solenoids therefore provides a simple and efficient method of providing voltage regulation which eliminates the need for complex, high power dissipation voltage regulators, by selective energizing the existing EEC system solenoids during the normally inactive portions of their operating cycle.

Other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
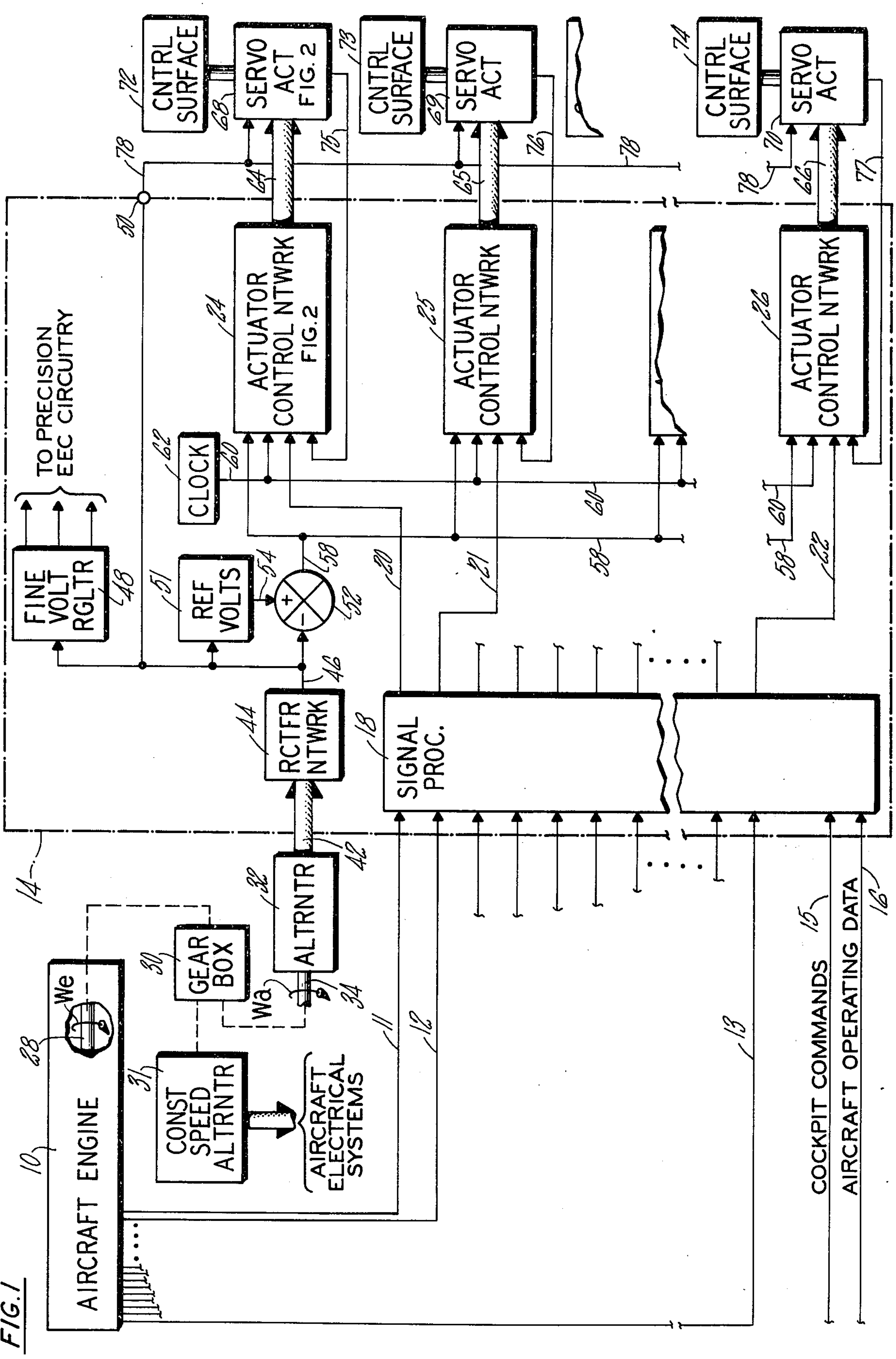
FIG. 1 is a system block diagram of an EEC unit including voltage regulation circuitry according to the present invention.

Referring now to FIG. 1, in an electronic engine control (EEC) system which controls the performance of an aircraft engine by providing position control of a plurality of engine controlled surfaces through a plurality of digital effector servo actuators, and which includes voltage regulation of the unregulated input power provided by an engine drive alternator in accordance with the present invention, an engine 10, such as a gas turbine engine, presents a plurality of signals representative of sensed engine parameters, such as air intake temperature, rotor speed, and exhaust gas temperature and pressure (provided by a plurality of engine mounted sensors, not shown) through lines 11–13 to an EEC unit 14. In addition, cockpit command signals, and aircraft operating data are presented to the EEC 14 on lines 15, 16, respectively. All signals are presented within the EEC to a signal processor 18 which processes the signals with predetermined control logic functions, in a manner well known in the art, to provide desired position signals through a plurality of lines 20–22 to an input of each of a plurality of actuator control networks 24–26. The desired position signals on the lines 24–26 represent the determined nominal position of a corresponding controlled surface in the engine which is necessary to provide a determined value of the corresponding sensed signal, or combination of signals. As described in detail hereinafter, each of the actuator control networks comprise a portion of a respective one of a plurality of feedback servo loops which position the corresponding controlled surface in response to the individual desired position signals.

The engine 10 is coupled through its rotor shaft 28, which rotates at engine RPM level, to an engine gearbox 30. Drive outputs are provided from the gearbox for the purpose of coupling the engine to one or more AC alternators. In a typical aircraft separate alternators are provided, a general purpose alternator 31 which is speed controlled and which provides 400 Hz electrical power for general use, and a dedicated alternator 32, which is not speed controlled, but is directly connected through coupling shaft 34 to the gearbox 30, such that the shaft 34 rotates at an angular velocity equal to that of the engine rotor shaft 28, and to the engine RPM level. The alternator 32 may be of any type well known in the art, and provides AC electrical power in single phase or three phase format at a frequency and amplitude in dependence on the angular velocity of the coupling shaft, and the number of poles in the alternator. The amplitude of the alternator voltage and current output signals increase substantially with angular velocity, as shown in FIG. 4, which illustrates a condition wherein the alternator magnetic characteristics provide a substantially linear increase in amplitude with engine RPM.

Figure 4:
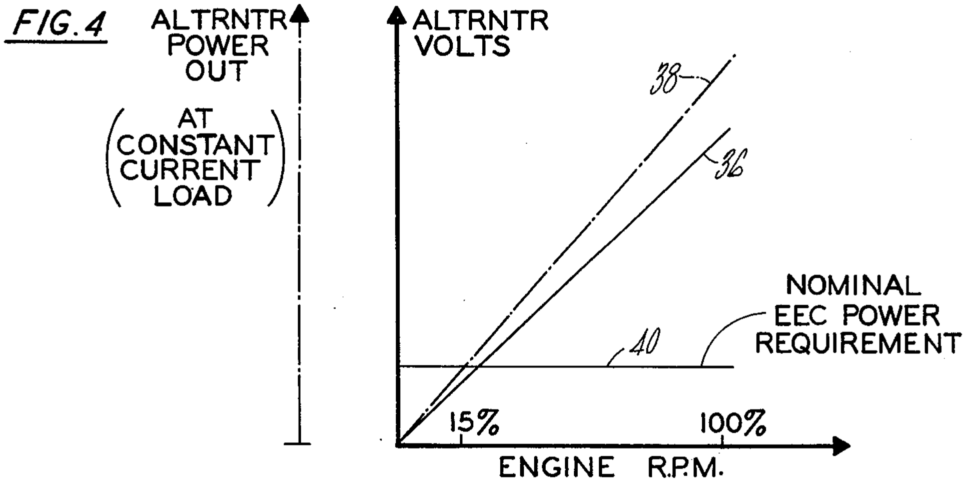
FIG. 4 is an illustration of an alternator voltage and power output signals as a function of engine RPM.

Referring to FIG. 4, the alternator output voltage increases linearly with respect to the engine RPM level as shown by the curve 36, while the total alternator output power 38 (for a constant load current value) increases in a similar linear manner with engine RPM. As stated hereinbefore, the EEC unit provides directive control of the engine performance throughout the engine RPM operating spectrum, and the nominal EEC input power requirement must be satisfied by the alternator at the lowest operational engine RPM level. A nominal EEC input power requirement is illustrated by a line 40, and as shown, there is a substantial increase in alternator power 38 and voltage 36 above the EEC power requirements at higher engine RPM levels, which the EEC must be protected against to prevent unit failure and to insure unit reliability. While conventional voltage regulation circuits regulate the output voltage amplitude by regulation of the output current (controlling the average input impedance of the EEC), dissipating the excess power within the regulator and causing the attendant requirement for complex heat dissipation designs, the present invention provides regulation of the alternator output voltage amplitude through current regulation, but without dedicated regulation circuitry and through the use of existing hardware within the EEC system.

Referring again to FIG. 1, the AC voltage and current signals from the alternator 32 are presented through a set of lines 42 to the input of a rectifier network 44 included within the EEC unit 16. The rectifier network 44 is of the type well known in the art, which rectifies and filters the AC voltage and current signals to provide a unipolar DC voltage signal (either positive or negative) which is presented to both the EEC unit circuitry and to the plurality of digital effector type servo actuators in the system. The actuators are the largest power consumption components of the system, and as described in detail hereinafter, each are separately energized in a pulse width manner at various duty cycles. As a result, the instantaneous load current value varies significantly about an average level with a corresponding variation in the amplitude of the DC voltage signal. The DC signal ($V_{alt}$) from the rectifier 44, is presented through a line 46 to the input of a precision voltage regulator 48, to an output terminal 50 of the EEC unit, to the input of a reference voltage circuit 51, and to the input of a summing junction 52. The precision regulator 48 is provided only for those low power, EEC unit circuits which may require high precision DC amplitude signals. The regulator may provide bipolar output signals derived from the unipolar DC signal on the line 46 through the use of power oscillators well known in the art, such as a Jensen type power oscillator circuit. The reference voltage circuit 51 provides a reference voltage signal representative of a maximum desired amplitude, equal to the maximum input voltage amplitude which may be tolerated by the EEC units, by presenting the DC voltage signal received on the line 46 to an an amplitude limit circuit within the reference circuit. The amplitude limit circuit may be of a type well known in the art, such as a passive zener diode and resistor combination, or an active operational amplifier having amplitude limiting in the feedback path. The reference voltage signal ($V_{ref}$) is presented by the reference circuit through a line 54 to a second input of the summing junction 52, which provides at its output on a line 58, a voltage error signal ($V_e$) representative of the difference between the reference DC voltage and the alternator DC voltage, or $V_e = V_{ref} - V_{alt}$. The error signal $V_e$ has a magnitude proportional to the excess of the alternator DC voltage signal amplitude above that of the nominal reference voltage signal amplitude. The error signal $V_e$ is presented through the line 58 to a second input of each of the plurality of actuator control networks 24–26, which also receive a timing signal on a line 60 from a system clock 62. As described in detail hereinafter with respect to FIG. 2, the actuator control networks 24–26 provide pulsed width, position change gate signals having an ON portion and an OFF portion as defined by a determined duty cycle through the sets of lines 64–66 to a corresponding one of a plurality of digital effector type servo actuators 68–70, each servo actuator being of a type which is substantially identical to the servo actuator shown and described with respect to FIG. 2 of a commonly owned, copending application entitled ADAPTIVE CONTROL SYSTEM USING POSITION FEEDBACK, U.S. Ser. No. 586,010, filed on June 1, 1975 by A. N. Martin. The servo actuators 68–70 provide displacement of corresponding controlled surfaces 72–74 in each of two opposite directions, and provide actual position signals, representative of the controlled surface position, through lines 75–77 to a fourth input of a corresponding one of the actuator control networks 24–26. The servo actuators 68–70 receive the DC signal $V_{alt}$, presented from the terminal 50 through a line 78 to an input of each actuator.

Figure 2:
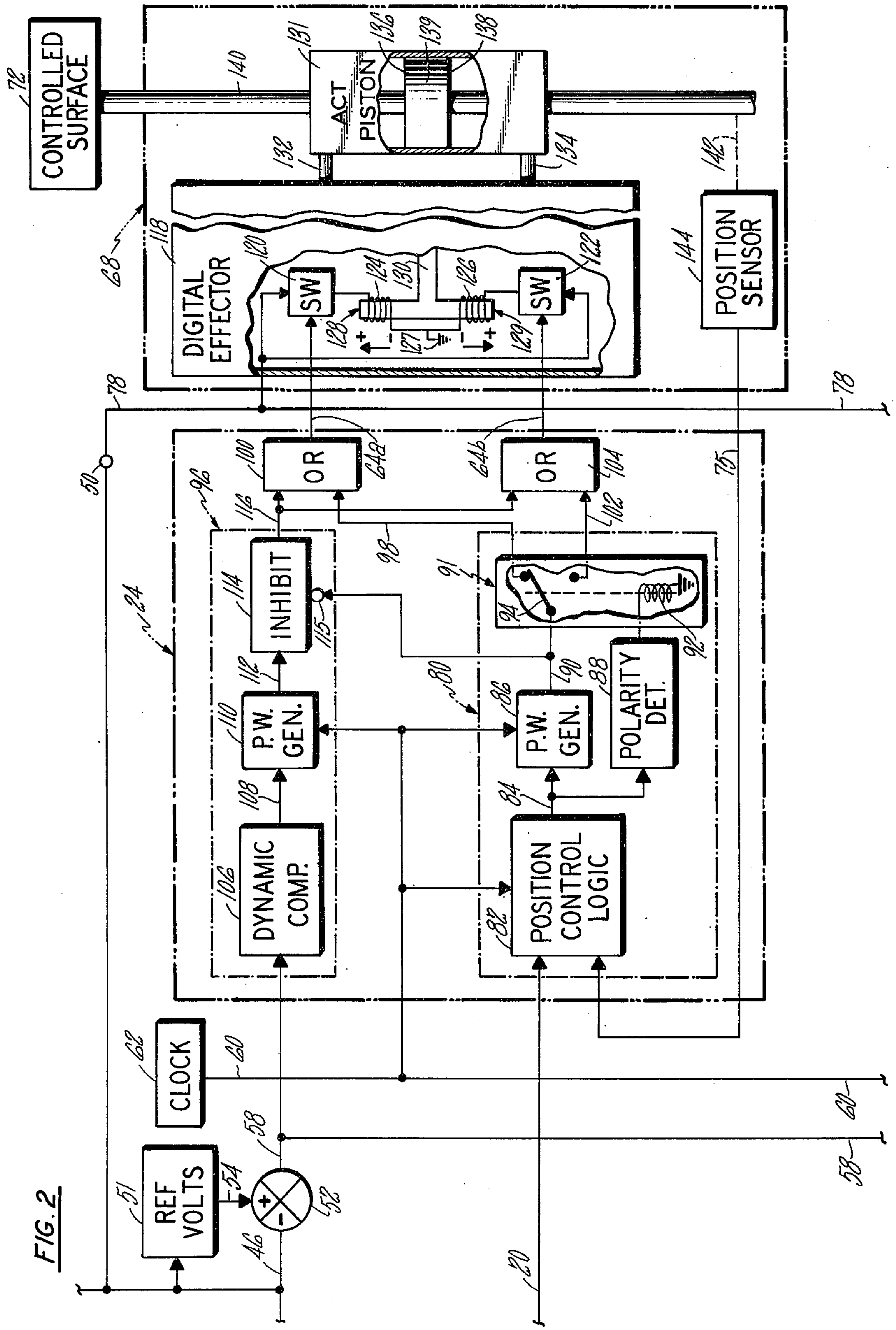
FIG. 2 is a detailed system block diagram of a portion of the embodiment of FIG. 1.

Referring now to FIG. 2, the actuator control network 24 receives the desired position signal on the line 20 at one input of a position control network 80, another input of which receives the actual position signal on the line 74 from the servo actuator 78. The position control circuit 80 is substantially identical to the control computer shown and described with respect to FIG. 3 of the hereinbefore referenced, copending application. As described therein, the position control circuit includes a position control logic network 82 which provides a bipolar position change command signal on a line 84 in response to the difference between the magnitude of the desired position signal on the line 20 and the actual position signal on the line 74. The magnitude and polarity of the command signal are representative of the desired magnitude and direction of the controlled surface displacement. The command signal on the line 84 is presented to the input of a pulse width generator 86, and to the input of a polarity detector 88. The pulse width generator 86, of a type known in the art, provides a series of pulsed width, position change gate signals on a line 90, each having an ON portion and an OFF portion the ratio of which is defined by a duty cycle value which varies from zero to one hundred percent in proportion to the magnitude of the command signal on the line 84. The pulse width generator 86 provides a continuous, or 100percent duty cycle signal on the line 90 in response to a maximum command signal magnitude. The polarity detector 88 provides selective activation of a switching device 91, such as a solid state switch, shown functionally as a single-pole, double-throw relay for purposes of consistency with the illustration of the control computer in the hereinbefore referenced copending application. The switching device 91 has a coil 92 and a wiper 94, and the polarity detector 88 selectively energizes the coil 92 in response to the polarity of the command signal on the line 84, such that the wiper 94 is selectively operable in either of two states in response to the energizing or deenergizing of the coil. The signal on the line 90 is presented to the wiper 94, and to a gate inhibit input of a regulation control circuit 96. The wiper 94 connects the line 90 through a line 98 to one input of an OR circuit 100, or through a line 102 to one input of an OR circuit 104, in dependence on the polarity of the command signal.

The actuator control network 24 receives the voltage error signal on the line 58 at the input of the voltage regulation circuit 96, where it is presented to a dynamic compensation network 106. The compensation network 106 is of a type well known in the art, which provides either lead, lag, or lead/lag compensation to the error signal, depending on the loop gain characteristics of the combined control network 24, servo actuator 68, and controlled surface 72. The compensated error signal is presented through a line 108 to the input of a second pulse width generator 110, identical to the pulse width generator 86, which provides pulsed width voltage regulation gate signals on a line 112 in response to the appearance of a voltage error signal on the line 108. The regulation gate signals on the line 112 have an ON portion and an OFF portion, the ratio of which is defined by a duty cycle value which may vary from zero to one hundred percent in proportion to the magnitude of the error signal on the line 108. Since the voltage error signal on the line 58 is unipolar, polarity detection such as that included in the position control loop 80 is not required. The regulation gate signals on the line 112 are presented to the input of an inhibit circuit 114, which is a voltage control switch well known in the art, such as a digital gated switch, or a switching transistor combination. The inhibit circuit 114 receives the position change gate signals on the line 90 at a gate inhibit input 115, and provides an inhibit to the transfer of the voltage regulation gate signal from the line 112 to a line 116 in response to the presence of an ON portion of a position change gate signal on the line 90, and a transfer of the regulation signal on the line 112 to the line 116 in the absence of an ON portion of the position change gate signal. The transferred regulation gate signal on the line 116 is presented to a second input of each of the OR circuits 100, 104.

The OR circuits 100, 104, as well known, couple the signals appearing at either input through output lines 64*a,* 64*b* (comprising the set of lines 64 of FIG. 1) to two inputs of a digital effector 118 comprising the electromechanical interface of the servo actuator 68. Within the digital effector 118, the lines 64*a,* 64*b* are presented to the gate inputs of gate controlled switches 120, 122, of a type known in the art, which are selectively operable in either of two states in response to the presence or absence of the ON portion of a gate signal at the gate input. Each of the switches 120, 122 are connected on one side to the DC voltage signal $V_{alt}$ on the line 78, and are connected on the other side to solenoids 124, 126, the other side of which are connected to the ground plane 127 of the system. The solenoids 124, 126 are disposed in opposite polarity on magnetic core elements 128, 129 which comprise portions of a beam assembly 130. The assembly is rotatably disposed within the digital effector 118, and is displaced through a mechanically limited arc in either an upward or downward direction in response to the magnetic field created by a respective one of the solenoids 124, 126 when energized by the signal $V_{alt}$, presented through a corresponding one of the switches 120, 122. The beam 130 in combination with the solenoids 124, 126 translates gate signals from the actuator control network 24 to a mechanical displacement, as described with respect to FIG. 2 of the hereinbefore referenced, commonly owned, copending application at page 9, line 20, et seq. Briefly stated, the limited mechanical displacement of the beam 130 provides a hydraulic gain or loss in a hydromechanical piston assembly 131 by increasing or decreasing fluid flow through a pair of hydraulic lines 132, 134 in dependence on the direction and time duration of the beam displacement. The bleed off of fluid in either the upper or lower portion of the assembly 131 creates a differential pressure (ΔP) across a top portion 136 and a bottom portion 138 of a piston 139. The piston 139 is disposed on a rod assembly 140 which has its top portion connected to the controlled surface 72 and which has its bottom portion connected through a mechanical linkage 142 to a position sensor 144. The sensor 144 provides the actual position signal representative of the position of the piston 139 and the controlled surface.

In operation, the ON portion of a gate signal on either lines 64*a,* or 64*b* activates a corresponding on of the switches 120, 122 for the time duration of the ON portion. The activated switch presents the signal $V_{alt}$ to the respective solenoid, causing current flow through the solenoid to the ground plane 127. The magnetic field created by the energized solenoid draws the magnetic core portion of the beam assembly 130 through the inside circumference of the solenoid causing a limited stroke displacement of the beam assembly through a limited stroke, and the assembly remains at the displaced location for the duration of the gate signal ON portion. The mechanical displacement of the beam 131 provides a hydraulic gain or loss which fluid loss in either the upper or lower portion of the piston assembly in dependence on the direction of the beam displacement which is in turn dependent on which of the solenoids 124, 126 are energized. The fluid loss creates a ΔP across the piston 139, and the piston is linearly displaced in an upward or downward direction in dependence on the gradient of the ΔP. In general, energizing the solenoid 124 results in an upward displacement of the piston 139 with a corresponding downward displacement of the piston in response to energizing the solenoid 126. The ΔP across the piston 139 remains essentially constant throughout the time interval of the gate signal ON portion, such that the piston is displaced at a relatively constant velocity during this interval. At the end of the ON portion the ΔP is reduced to zero and the piston stops, and the piston position is maintained for the interim OFF portion of the gate signal.

Figure 5:
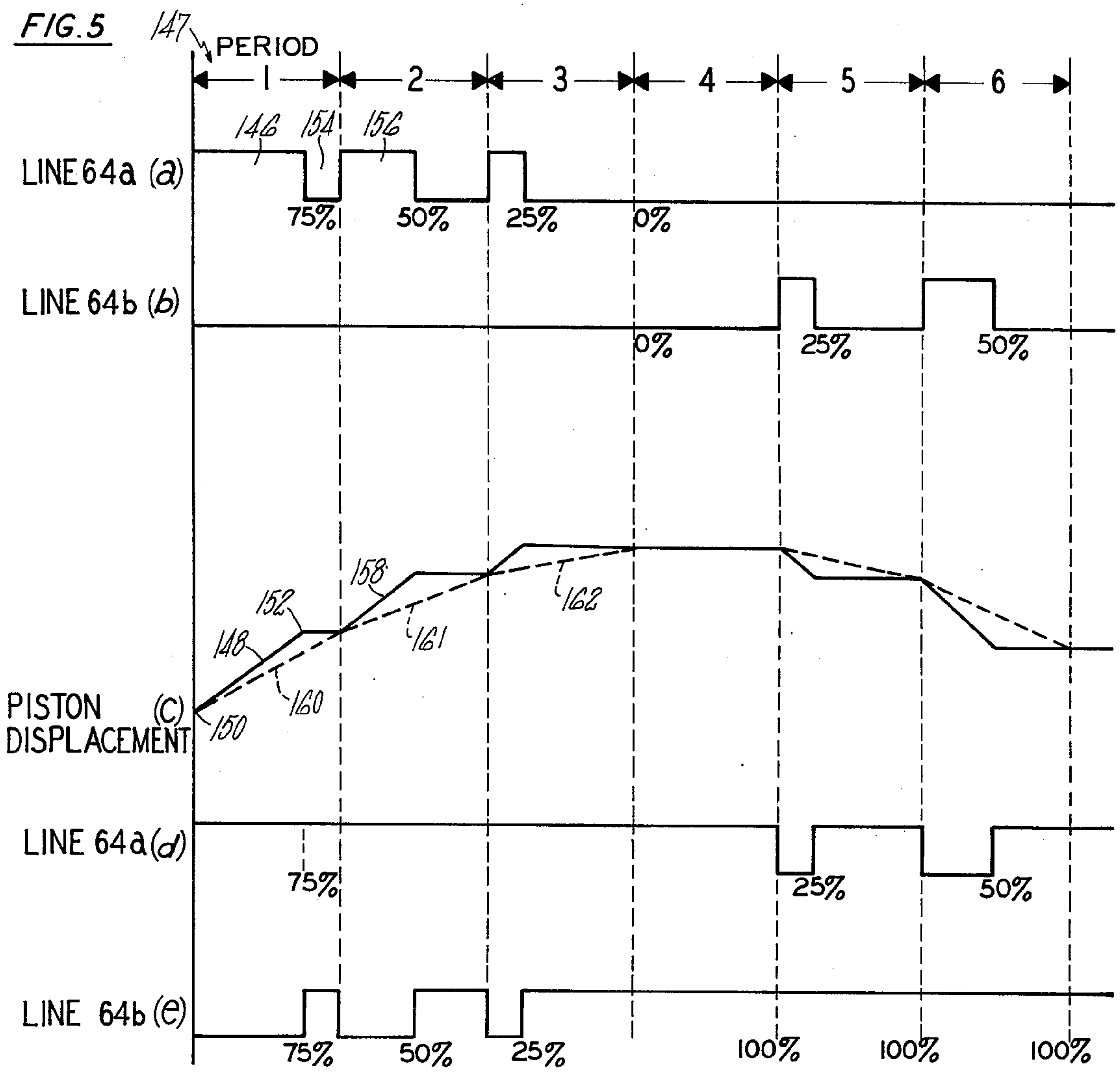
FIG.5 is a comparative illustration of the position change gate signals provided by the embodiments of FIGS. 1 and 2.

The operation of the actuator piston displacement as a function of the gate signal duty cycle (the ratio of the ON portion to the OFF portion) is shown generally in FIG. 5, illustrations (*a*) through (*c*). In illustration (*a*)the ON portion 146 of a position change gate signal on the **line 64*a* having a 75 percent duty cycle within a first period 147, causes the piston 139 to be displaced at a velocity defined by the slope of the line 148** (illustration (*c*)) from a first position 150 to a second position 152. The piston displacement is shown to be linear (as illustrated by the line 148) to facilitate the description of operation. As may be appreciated by those skilled in the art, the actual displacement will be somewhat nonlinear due to friction and changes in the controlled surface loading during the piston stroke. The piston position 152 is maintained throughout the OFF portion 154 until the appearance of the ON portion 156 of a successive position change gate signal in period two which causes the piston displacement at a velocity defined by the slope of the line 158. The average piston velocity (displacement Δ L over a time interval Δ *t* defined by the period of the gate waveforms) is determined by the duty cycle value of the gate waveforms, as shown by the average velocity curves 160 through 162 which have successively smaller values (small slope values of $\Delta L/\Delta t$) for the decreasing duty cycle values in periods one through three. In this manner the slew rate velocity of the controlled surface is determined by the duty cycle value of the gate signals. In the absence of gate signals on either of the lines 64*a,* 64*b,* the actuator position is maintained in a steady state location (period four of illustrations (*a*) through (*c*)), since both solenoids are de-energized and there is no magnetic gradient to cause displacement of the beam 130.

As may be appreciated, the unregulated DC voltage signal $V_{alt}$ on the line 78 provides current excitation for the selected one of the solenoids 124, 126 only for the time duration interval of the ON portion of a position gate signal presented on a respective one of the lines 64*a,* 64*b.* The amplitude of the unregulated voltage on the line 78 is reduced during that ON portion interval in which the solenoids are drawing current due to the output source impedance of the rectifier circuit. Since the solenoids 124, 126 and their associated switching circuitry are the only electrical components within the actuator, the power consumption of the servo actuator 68 in any given period is directly proportional to the gate signal ON time. Each EEC system comprises a plurality of actuators and, as stated hereinbefore, the solenoids are the largest single power consumption elements in the EEC, such that the current presented during the ON portion of the gate signals to the plurality of actuators (68–70 of FIG. 1) accounts for substantially all of the system power consumption within any given period. Therefore, the instantaneous system power consumption is essentially determined by the sum of the instantaneous power consumption in each of the plurality of actuators. Increasing the sum actuators power through selective energizing of the individual actuator solenoids coincidentally with an alternator excess power condition provides an effective method of dissipating the excess alternator power outside of the EEC unit itself, in the actuators, if such may be accomplished without affecting the actuator performance in controlling the controlled surface position. Since the piston 139 responds only to the magnetic field gradient provided by individually energizing one or the other of the solenoids 124, 126, energizing both coils simultaneously ideally provides equal magnitude, oppositely polarized, magnetic fields such that no magnetic gradient is created. Therefore, it is possible to reverse the operating characteristics of the actuator, i.e., instead of de-energizing the selected solenoid at the end of the ON portion as determined by the position gate signal duty cycle value interval, whenever excess alternator power is present the selected solenoid is provided with a one hundred percent duty cycle and the opposite solenoid is energized at the end of the determined ON portion interval, during the normally OFF portion of the controlling gate signal as shown in illustrations (*d*) and (*e*) of FIG. 5. In the first period of FIG. 5, illustration (*a*), the ON portion 146 of the position change gate signal on the line 64*a* has a 75 percent duty cycle, at the end of which the OFF portion 154 cuts off the switch 120 (FIG. 2) causing the solenoid 124 to be de-energized and reducing the magnetic field gradient to zero. In illustrations (*d*) and (*e*), where an excess alternator power condition is assumed to exist, the line 64*a* gate signal remains on for a full one hundred percent duty cycle while a position gate signal is provided on the line 64*b* to the switch 122, with an ON portion which is initiated and maintained over the remaining 25 percent of period one. Ideally, this provides a zero magnetic field gradient over the remaining 25 percent since both of the solenoids 124, 126 are simultaneously energized. As a result their opposing polarity magnetic fields cancel and there is no displacement of the piston 139 over this interval, as shown in illustration (*c*). A comparison of the first period waveforms of illustrations (*a*) and (*b*) with those of illustrations (*d*) and (*e*) show an increase in actuator power consumption by a factor of 5/3 (75 percent energized in illustrations (*a*) and (*b*) as compared to 125 percent energized in illustrations (*d*) and (*e*)). The increase in power consumption provided by the solenoid operation of illustrations (*d*) and (*e*) is inversely proportional to the commanded duty cycle, as shown in periods two and three where consumption increases by factors of three and seven for corresponding duty cycle values of 50 percent and 25 percent. Also, as shown in period four, where the actuator piston is maintained at a steady state position the waveforms of illustrations (*a*) and (*b*) indicate no power consumption due to both solenoids being de-energized, whereas in illustrations (*d*) and (*d*) both solenoids are energized for one hundred percent of the period, providing an obviously dramatic increase in actuator power consumption.

Figure 3:
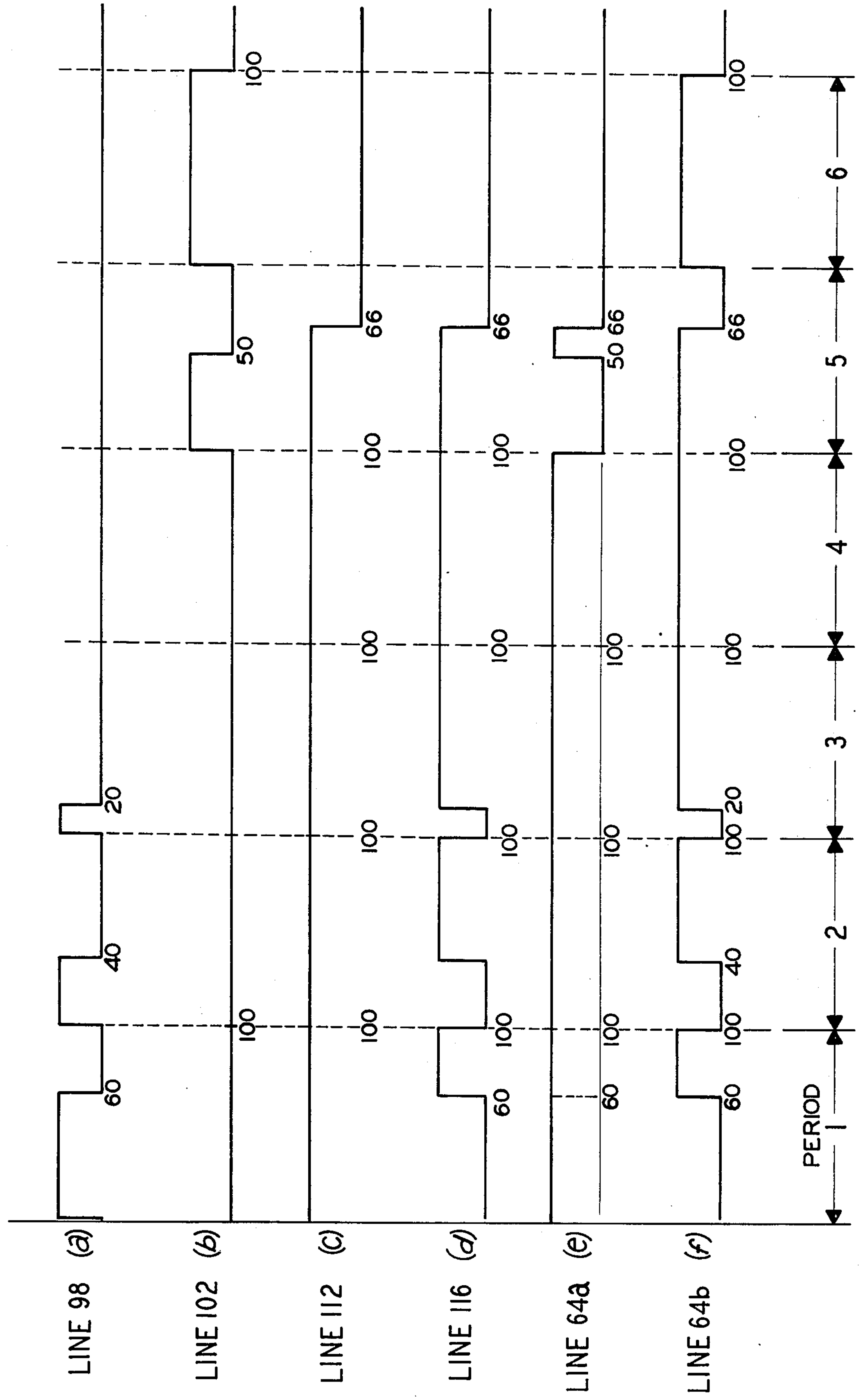
FIG. 3 is an illustration of the voltage regulation gate signals provided by the embodiments of FIGS. 1 and 2.

The illustrated solenoid operation of FIG. 5 (illustrations (*d*) and (*e*)) is provided by the voltage regulation circuits included in each of the actuator control networks 24–26, only in the presence of an alternator excess power condition as manifested by a voltage error signal on the line 58. In operation, the voltage regulation circuit 96 (FIG. 2) provides a voltage regulation gate signal on the line 112 having an ON portion time duration proportional to the magnitude of the error signal on the line 58. The inhibit circuit 114 transfers the regulation gate signal through the line 116 to one input of each of the OR gates 100, 104 only in the absence of an ON portion of a position change gate signal at the gate inhibit 115. Referring again to FIG. 2, assume a given position change gate signal on the line 90 has a sixty percent duty cycle, and a simultaneous voltage regulation gate signal on the line 112 has a one hundred percent duty cycle in response to a maximum error signal on the line 58. The gate signals have equal pulse repetition periods (periods one through six) in dependence on the timing signal from the clock 62. The position gate signal is presented to the gate inhibit 115, and through the wiper 94 (in the position shown) to the line 98, the position change, and voltage regulation gate signals appearing simultaneously on the lines 98 and 112 as shown in FIG. 3, illustrations (*a*) and (*c*). The 60 percent duty cycle ON portion of the position gate signal is coupled through the OR gate 100 to the line 64*a* (illustration (*e*)) while the inhibit circuit 114 prevents the transfer of the regulation gate signal to the line 116 for the duration of the position signal ON portion (illustration (*d*)). At the end of the ON portion, the inhibit circuit 114 transfers the regulation signal to the line 116 (illustration (*d*)) which presents the regulation signal through each of the OR gates 100, 104 to the lines 64*a*, 64*b*, simultaneously, as shown in illustrations (*e*). (*f*). Therefore, the total gate signal presented to the actuator 68 (FIG. 2) in period one consists of an initial, single 60 percent duty cycle ON portion on the line 64*a* for initially energizing the solenoid 128 alone to provide the commanded position displacement of the piston 139, and a remaining 40 percent duty cycle signal on both lines 64*a*, 64*b* for energizing both coils simultaneously to provide an increased current load on the DC voltage signal to reduce the magnitude of the error signal. For that portion of the period one interval during which both solenoids 129, 126 are energized, the magnetic field gradient is zero, and the piston remains stationary at a steady state position determined by the 60 percent duty cycle. A comparison of the relative power consumption provided by the gate signals of illustrations (*e*) and (*f*) with that of illustrations (*a*) and (*d*) show an increase in power consumption by a factor of approximately 2.33. The same procedure is repeated in period two where the pulse width generator 86 commands a 40 percent duty cycle gate signal, causing the inhibit 114 to provide a voltage regulation gate signal on the line 116 only at the end of the 40 percent duty cycle ON portion causing the solenoid 124 to be energized alone for the first 40 percent of the period, and causing both solenoids 124, 126 to be energized for the remaining 60 percent of the period to increase the power consumption in the period by a factor of four.

As shown in FIG. 3, the voltage regulation circuit method and apparatus of FIG. 2 provides for position change gate signal priority by removing the regulation gate signals at the appearance of a position signal ON portion, such that the position control function of the system is unaffected. The simultaneous energizing of both solenoids is provided only for those conditions where there is a voltage error signal on the line 58 and then only for a voltage regulation gate signal duty cycle necessary to reduce the error signal magnitude to zero. In the method of voltage regulation according to the present invention, both the cost and weight of the EEC unit are reduced by eliminating requirement for high power regulators having complex cooling design requirements by using the existing high power digital effector solenoids to waste the power in a servo actuator, which is itself designed to provide excellent heat dissipation characteristics through the actuator structure, and hydraulic fluid. Similarly, although the invention has been shown and described with respect to an illustrative embodiment thereof, it should be understood by those skilled in the art that the foregoing and various other changes, omissions and additions in the form and detail thereof may be made therein without departing from the spirit and scope of the invention.

Having thus described a typical embodiment of my invention, that which I claim as new and desire to secure by Letters Patent is:

1. In a system for controlling the position of a controlled surface with a servo actuator of the type having a mechanical assembly for providing displacement of the controlled surface in each of two directions in response to a magnetic field provided by a respective one of two oppositely polarized solenoids disposed within the actuator, the system receiving electrical power from an unregulated voltage source and each solenoid providing a corresponding polarity magnetic field in response to an unregulated voltage signal from the voltage source presented through a corresponding one of a pair of solenoid gated switches in response to the ON portion of a gating signal presented to a gate input thereof, the system including a control unit for providing position change gate signals in response to a displacement signal presented thereto, each position change gate signal having an ON portion and an OFF portion with the time duration of the ON portion being proportional to the magnitude of the displacement signal, the control unit presenting the position change gate signals to the gate signal input of a respective one of the gated switches through a corresponding one of a pair of output lines in dependence on the polarity of the displacement signal, circuitry for providing voltage regulation of the unregulated voltage source, comprising:

signal means for providing a reference voltage signal;

summing means, responsive to the unregulated voltage signal and to the reference voltage signal, for providing a voltage error signal in response to an unregulated voltage signal having an absolute value amplitude greater than that of the reference voltage signal, the error signal having a magnitude proportional to the difference therebetween; and regulation means, responsive to the voltage error signal and to the position change gate signals, for presenting the voltage regulation gate signals to the gate input of both gated switches simultaneously, in response to the presence of a voltage error signal in the absence of a position change gate signal ON portion, to provide concurrent energizing of both solenoids for a time duration proportional to magnitude of the voltage error signal, said regulation means not presenting the regulation gate signals to the gated switches in the presence of a position change gate signal ON portion.

2. The regulation circuitry of claim 1, wherein said regulation means comprises:

gate signal means, connected for response to said summing means for providing the voltage regulation gate signals in response to the presence of a voltage error signal, the voltage regulation gate signals having an ON portion and an OFF portion, the ON portion time duration being proportional to the magnitude of the voltage error signal;

gated switching means having a gate inhibit input, and having a switch portion including a signal input and a signal output, said switching means being responsive at said signal input to the voltage regulation gate signals from said gate signal means and responsive at said gate inhibit input to the position change gate signals from the control unit, for presenting a regulation gate signal appearing at said signal input to said signal output in the absence of an ON portion of a position change gate signal at said gate inhibit input, and for not presenting the regulation gate signals to said signal output in the presence of an ON portion of a position change gate signal at said gate inhibit input; and a pair of OR gate means, each having two inputs and each being responsive at a first input to the regulation gate signals from said gated switching means signal output, and each being responsive at a second input to a corresponding one of the position change gate signal output lines from the control unit, each of said OR gate means presenting the signals appearing at either of the two inputs to a respective one of the solenoid gated switches.

3. In an electronic engine control system for controlling the performance of an engine by position control of a plurality of controlled surfaces within the engine through a corresponding one of a plurality of servo actuators, the system and the servo actuators receiving electrical power from an unregulated voltage source, each servo actuator having a mechanical assembly for providing displacement of the corresponding controlled surface in each of two directions in response to a magnetic field provided by a respective one of two oppositely polarized solenoids disposed within the actuator, each solenoid providing an opposite polarity magnetic field in response to the presentation of an unregulated voltage signal from the voltage source by related one of a pair of solenoid gated switches in response to the ON portion of a gating signal presented to a gate input thereof, the system including a control unit for providing position change gate signals to each of the servo actuators in response to bipolar position command signals provided for each controlled surface, each position change gate signal having an ON portion and an OFF portion with the time duration of the ON portion being proportional to the magnitude of the respective command signal, the control unit presenting the related position gate signals through a pair of output lines to the gate input of one or the other of the solenoid gated switches of each actuator, alternatively, in dependence on the polarity of the command signal, circuitry for providing voltage regulation of the unregulated voltage source, comprising:

signal means for providing a reference voltage signal;

summing means, responsive to the unregulated voltage signal and to the reference voltage signal, for providing a voltage error signal in response to an unregulated voltage signal having an absolute value amplitude greater than that of the reference voltage signal, the error signal having a magnitude proportional to the difference therebetween; and a plurality of regulation means, one for each of the plurality of servo actuators, each responsive to the voltage error signal and to the related position change gate signals, each presenting the voltage regulation gate signals to the gate input of both of the related actuator solenoid gated switches simultaneously, in response to the presence of a voltage error signal in the absence of the related position change gate signal ON portion to provide concurrent energizing of both solenoids for a time duration proportional to the magnitude of the voltage error signal, said regulation means not presenting the regulation gate signals to the gated switches in the presence of the related position change gate signal ON portion.

4. The regulation circuitry of claim 3, wherein each of said regulation means comprises:

gate signal means, connected for response to said summing means for providing the voltage regulation gate signals in response to the presence of a voltage error signal, the voltage regulation gate signals having an ON portion and an OFF portion, the ON portion time duration being proportional to the magnitude of the voltage error signal;

gated switching means having a gate inhibit input, and having a switch portion including a signal input and a signal output, said switching means being responsive at said signal input to the voltage regulation gate signals from said gate signal means and responsive at said gate inhibit input to the position change gate signals from the control unit, for presenting a regulation gate signal appearing at said signal input to said signal output in the absence of an ON portion of a position change gate signal at said gate inhibit input, and for not presenting the regulation gate signals to said signal output in the presence of an ON portion of a position change gate signal at said gate inhibit input; and a pair of OR gate means, each having two inputs and each being responsive at a first input to the regulation gate signals from said gated switching means signal output, and each being responsive at a second input to a corresponding one of the position change gate signal output lines from the control unit, each of said OR gate means presenting the signals appearing at either input to a related one of the solenoid gated switches.

5. In a system for controlling the position of a controlled surface with a servo actuator of the type having a mechanical assembly for providing displacement of the controlled surface in each of two directions in response to a magnetic field provided by a respective one of two oppositely polarized solenoids disposed within the actuator, the system receiving electrical power from an unregulated voltage source and each solenoid providing a corresponding polarity magnetic field in response to an unregulated voltage signal from the voltage source presented through a corresponding one of a pair of solenoid gated switches in response to the ON portion of a gating signal presented to a gate input thereof, the system including a control unit for providing position change gate signals in response to a displacement signal presented thereto, each position change gate signal having an ON portion and an OFF portion with the time duration of the ON portion being proportional to the magnitude of the displacement signal, the control unit presenting the position change gate signals to the gate signal input of a respective one of the gated switches through a corresponding one of a pair of output lines in dependence on the polarity of the displacement signal, a method for regulating the voltage signal from the unregulated voltage source, comprising the steps of:

providing a reference voltage signal;

summing the unregulated voltage signal with said reference voltage signal;

detecting an unregulated voltage signal having an absolute value amplitude greater than that of said reference voltage signal, and providing in response thereto, a voltage error signal having a magnitude proportional to the difference therebetween;

providing voltage regulation gate signals in response to the presence of said voltage error signal, each regulation gate signal having an ON portion and an OFF portion, the ON portion having a time duration proportional to the magnitude of said voltage error signal; and presenting said voltage regulation gate signals to the gate input of both solenoid gated switches simultaneously, only in response to the presence of said voltage error signal in the absence of a position change gate signal ON portion, to provide a concurrent energizing of both solenoids for a total time duration equal to that of said regulation gate signal ON portion.

6. An improved electronic engine control system of the type which controls the performance of an engine by position control of a plurality of controlled surfaces within the engine through a corresponding one of a plurality of servo actuators, the system and the servo actuators receiving electrical power from an unregulated voltage source, each servo actuator having a mechanical assembly for providing displacement of the corresponding controlled surface in each of two directions in response to a magnetic field provided by a respective one of two oppositely polarized solenoids disposed within the actuator, each solenoid providing an opposite polarity magnetic field in response to the presentation to an unregulated voltage signal from the voltage source by related one of a pair of solenoid gate switches in response to the ON portion of a gating signal presented to a gate input thereof, the system including a control unit for providing position change gate signals to each of the servo actuators in response to bipolar position command signals provided for each controlled surface, each position change gate signal having an ON portion and an OFF portion with the time duration of the ON portion being proportional to the magnitude of the respective command signal, the control unit presenting the related position gate signals through a pair of output lines to the gate input of one or the other of the solenoid gated switches of each actuator, alternatively, in dependence on the polarity of the command signal, wherein the improvement comprises:

signal means for providing a reference voltage signal;

summing means, responsive to the unregulated voltage signal and to the reference voltage signal, for providing a voltage error signal in response to an unregulated voltage signal having an absolute value amplitude greater than that of the reference voltage signal, the error signal having a magnitude proportional to the difference therebetween; and a plurality of regulation means, one for each of the plurality of servo actuators, each responsive to the voltage error signal and to the related position change gate signals, each presenting the voltage regulation gate signals to the gate input of both the related actuaor solenoid gated switches simultaneously, in response to the presence of a voltage error signal in the absence of the related position change gate signal ON portion, to provide concurrent energizing of both solenoids for a time duration proportional to the magnitude of the voltage error signal, said regulation means not presenting the regulation gate signals to the gated switches in the presence of the related position change gate signal ON portion.

7. The improved engine control system of claim 6, wherein each of said regulation means comprises:

gate signal means, connected for response to said summing means for providing the voltage regulation gate signals in response to the presence of a voltage error signal, the voltage regulation gate signals having an ON portion and an OFF portion, the ON portion time duration being proportional to the magnitude of the voltage error signal;

gated switching means having a gate inhibit input, and having a switch portion including a signal input and a signal output, said switching means being responsive at said signal input to the voltage regulation gate signals from said gate signal means and responsive at said gate inhibit input to the position change gate signals from the control unit, for presenting a regulation gate signal appearing at said signal input to said signal output in the absence of an ON portion of a position change gate signal at said gate inhibit input, and for not presenting the regulation gate signals to said signal output in the presence of an ON portion of a position change gate signal at said gate inhibit input; and a pair of OR gate means, each having two inputs and each being responsive at a first input to the regulation gate signals from said gated switching means signal output, and each being responsive at a second input to a corresponding one of the position change gate signal output lines from the control unit, each of said OR gate means presenting the signals appearing at either of the two inputs to a respective one of the solenoid gated switches.

* * * * *

UNITED STATES PATENT AND TRADEMARK OFFICE

CERTIFICATE OF CORRECTION

PATENT NO. : 4,056,732

DATED : November 1, 1977

INVENTOR(S) : Anthony Newman Martin

It is certified that error appears in the above-identified patent and that said Letters Patent are hereby corrected as shown below:

Col. 2, line 27, "is" should read --if--

Col. 3, line 1, after "regulation" insert --gate--

Col. 3, line 68, "drive" should read --driven--

Col. 6, line 4, "100percent" should read --100 percent--

Col. 8, line 34, after "values", "(small" should read --(smaller--

Col. 9, line 17, after "sum", "actuators" should read --actuator--

Col. 10, line 5, after "and", "(d)" should read --(e)--

Col. 10, line 43, cancel "." and insert --,--

Col. 14, line 52, "to" should read --of--

Col. 14, line 53, "gate" should read --gated--

Col. 15, line 13, "actuaor" should read --actuator--

UNITED STATES PATENT AND TRADEMARK OFFICE

CERTIFICATE OF CORRECTION

PATENT NO. : 4,056,732

DATED : November 1, 1977

INVENTOR(S) : Anthony Newman Martin

It is certified that error appears in the above-identified patent and that said Letters Patent are hereby corrected as shown below:

Col. 7, line 66, "on" should --one--

Signed and Sealed this

*Fourth* Day of *July 1978*

[SEAL]

*Attest:*

RUTH C. MASON
*Attesting Officer*

DONALD W. BANNER
*Commissioner of Patents and Trademarks*